United States Patent [19]

Witte et al.

[11] 4,381,163

[45] Apr. 26, 1983

[54] SELF-LOCKING NUT

[75] Inventors: Erwin C. Witte, Placentia; William D. Myers, Fullerton, both of Calif.

[73] Assignee: Microdot Inc., Darien, Conn.

[21] Appl. No.: 194,136

[22] Filed: Oct. 6, 1980

Related U.S. Application Data

[63] Continuation of Ser. No. 959,520, Nov. 13, 1978, abandoned.

[51] Int. Cl.³ .............................................. F16B 39/30
[52] U.S. Cl. ..................................... 411/311; 411/282
[58] Field of Search ............... 411/311, 310, 309, 308, 411/282, 281, 277, 283, 276; 10/86 A

[56] References Cited

U.S. PATENT DOCUMENTS

| 2,452,192 | 10/1948 | Hosring | 411/283 |
| 2,897,867 | 8/1959 | Torre | 411/281 |
| 3,034,611 | 5/1962 | Zenzic | 411/335 X |
| 4,076,064 | 2/1978 | Holmes | 411/285 |

Primary Examiner—Ramon S. Britts
Attorney, Agent, or Firm—Lyon, Lyman R.

[57] ABSTRACT

A prevailing torque type self-locking nut has an internal aperture provided with wedge ramp type threads, the aperture being tapered in cross section adjacent the top of the nut.

1 Claim, 4 Drawing Figures

SELF-LOCKING NUT

This is a continuation of application Ser. No. 959,520 filed Nov. 13, 1978, now abandoned.

BRIEF SUMMARY OF THE INVENTION

It is a purpose of this invention to provide a nut having wedge ramp type threads with a prevailing torque feature.

The invention accomplishes this purpose by means of a design in which the diameter of the internal wedge ramp threads at the top of the nut is reduced to impose a resistance to threading of a bolt in the nut.

DESCRIPTION OF THE INVENTION

Figure 1:
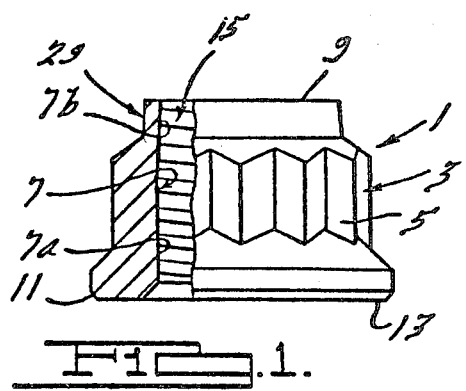
FIG. 1 is a side elevation, partly broken away, of a nut embodying the invention.

The nut 1 comprises a body 3 formed of suitable material, such as steel, and having an outer periphery 5 and an inner aperture 7 that is coaxial with the outer periphery. The body 3 has a top 9 and a bottom 11, including annular bearing surface 13, and the aperture extends through the body between the top and bottom. The body 3 is provided with internal threads 15 of the wedge ramp type and these define the aperture 7. The body 3 is also provided with suitable external wrenching surfaces symmetrical with the axis, such as the twelve point configuration illustrated on the outer periphery 5. It will be understood that the invention may be used with other nut body design than the presently preferred embodiment that is illustrated.

The helical wedge ramp threads 15 are preferably of the configuration shown, through dimensional and angular variations are within the broad purview of the invention. Such threads are illustrated in U.S. Pat. No. 4,076,064. Each thread comprises a lead flank 17 and a flollowing flank 19 and a root in the form of a wedge ramp 21. In the preferred and illustrated embodiment wherein the threads 15 are to mate with standard external threads 23 on a bolt 25, the flanks 17 and 19 make angles of about 30° to an imaginary plane normal to the axis of the aperture 7 and the wedge ramp 21 is substantial normal to the lead flank 17.

Figure 4:
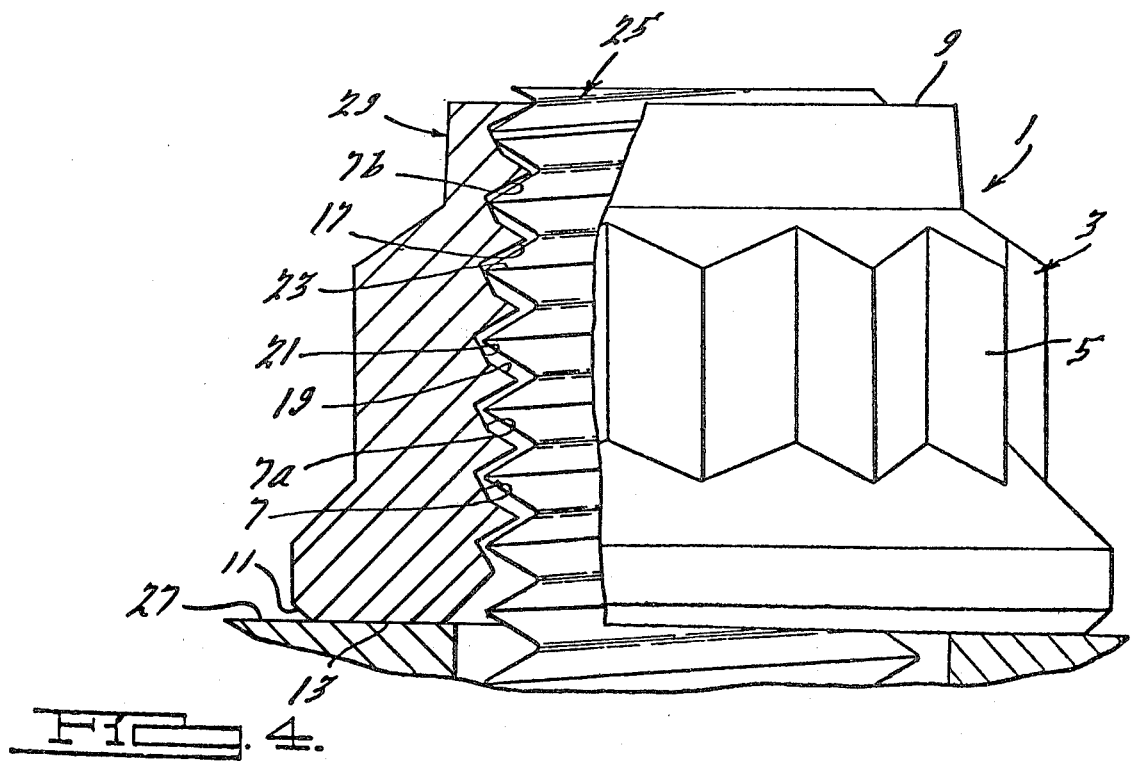
FIG. 4 is an enlarged view, partly in section of the nut of FIG. 1 assembled on a bolt and pressing against a workpiece.

In accordance with the invention, the aperture 7 has a lower section 7a that is of uniform circular cross section or diameter and an upper section 7b which is inwardly tapered. The threads 15 are in both sections; hence, the threads in section 7b and, in particular, the wedge ramps 21 thereof, are of gradually decreasing width at least along one or more radii of the aperture. Therefore, as seen best in FIG. 4, the arrangement of aperture sections 7a and 7b will enable a bolt 25 to be free spinning with respect to the nut until its threads 23 enter the tapered section 7b and encounter wedge ramps 21 having a diameter less than their major diameter. At this point the bolt threads 21 will encounter resistance from the nut to provide prevailing torque. Continued application of torque to the assembly of nut 1 and bolt 25 will cause the nut body adjacent aperture section 7b to elastically dilate; and, when the bearing surface 13 engages the workpiece 27, tension in the bolt and elongation thereof will enable the bolt threads 23 to ride down the wedge ramps 21. FIG. 4 shows the beginning of substantial pressure between the nut and the workpiece, and as bolt load increases still more the bolt threads 23 will come in contact with the wedge ramps 21 in the lower aperture section 7a. Continued application of torque will cause the bolt threads to ride further and further down the wedge ramps toward the following flanks 19 to align the parts, take up clearances, and powerfully resist unintentional loosening.

Figure 2:
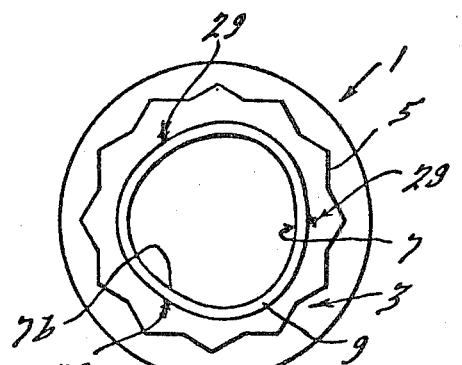
FIG. 2 is a top elevation of the nut of FIG. 1.
Figure 3:
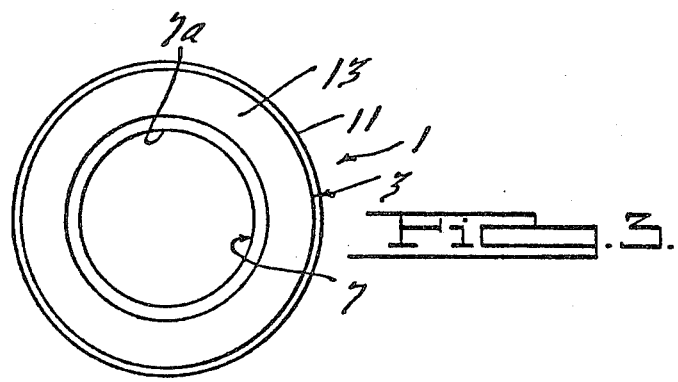
FIG. 3 is a bottom elevation of the nut of FIG. 1.

The tapered aperture section 7b in combination with the wedge ramps 21 provide the assembly with substantial resistance to loosening under vibratory loads of any kind. All of the threads 15 are preferably formed in one operation and on the same diameters, i.e. in an aperture 7 of constant uniform circular cross section. The nut body 3, preferably, is subsequently deformed by the application of radial inward pressure on its upper portion. This may be along a diameter to form an oval but is preferably at three equiangularly spaced points 29. If the nut is made of steel or equivalent materials, the application of sufficient squeeze pressure will permanently deform the nut body into substantially the shape shown in FIG. 2, it is being recognized that FIG. 1 and FIG. 4 are partial cross sections along a plane through point 29. Thus, the aperture 7b may be regarded as a tapered trilobular cross section while the lower section 7a remains substantially circular as shown in FIG. 3. When the tapered section 7b is formed after the aperture has been threaded, the wedge ramps 21 in the section 7b will be bent inwardly, i.e., toward the vertical, by an angle corresponding to an angle of taper. This has the effect of bringing the wedge ramp angle closer to the vertical (i.e. axial) and of increasing the friction between mating threads.

While the method just described for forming the taper is presently preferred, it is within the broad purview of the invention to provide the aperture 7 with a tapered upper section 7b by other methods. Tapers of this type in nuts having ordinary V or standard threads are known in the fastener industry, and nuts with locking action provided by inwardly squeezed two or three point shapes on standard thread sections are commercially available. Thus, known methods of forming the taper may be employed, if desired, in using the invention.

Modifications in the specific structure described may be made without departing from the spirit and scope of the invention.

We claim:

1. A nut of the prevailing torque type comprising a body having a through aperture and an outer wrenching periphery coaxial with the aperture, said body having a top at one end of the aperture and a bottom at the other end of the aperture including a bearing surface, said aperture including a uniform right circular cylindrical internal wall portion extending from said bearing surface to an intermediate axial level of said body and a tapered internal wall portion extending from the uniform portion toward the top of said body, said tapered portion having internal diameters decreasing in the direction away from said bearing surface in substantially uniform relation to distance from said bearing surface, said body being internally threaded along the length of both the uniform and tapered portions of said aperture with wedge ramp root type threads, the wedge ramp roots of the threads in said aperture converging toward the bearing surface of said body, said wedge ramp roots in said uniform portion extending at angles of about 30° with respect to the axis of the aperture and in said tapered portion extending at angles less than 30° with respect to said axis, the crests of the external threads on said male member being initially engageable with the wedge ramps on the tapered portion of said aperture at the top of said nut so as to place substantially the entire portion of said male member within the aperture of said nut in tension when a load is placed on the bearing surface thereof.

* * * * *